US012682207B2

(12) United States Patent (10) Patent No.: US 12,682,207 B2
Yogaraj et al. (45) Date of Patent: Jul. 14, 2026

(54) ENHANCING SILENT FEATURES WITH ADVERSARIAL NETWORKS FOR IMPROVED MODEL VERSIONS

(71) Applicant: INTERNATIONAL BUSINESS MACHINES CORPORATION, Armonk, NY (US)

(72) Inventors: Kavitha Hassan Yogaraj, Bangalore (IN); Shantanu Sinha, Kolkata (IN); Amit Kumar Raha, Barrackpore (IN); Shikhar Kwatra, San Jose, CA (US); Debajyoti Bagchi, Kolkata (IN); Aaron K. Baughman, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 873 days.

(21) Appl. No.: 17/938,162

(22) Filed: Oct. 5, 2022

(65) Prior Publication Data

US 2024/0119252 A1 Apr. 11, 2024

(51) Int. Cl.
*G06N 3/04* (2023.01)
(52) U.S. Cl.
CPC ...................................... *G06N 3/04* (2013.01)
(58) Field of Classification Search
CPC ............. G06N 3/04; G06N 5/01; G06N 3/045
See application file for complete search history.

(56) References Cited

U.S. PATENT DOCUMENTS

| | | | |
|---|---|---|---|
| 7,702,597 B2 | 4/2010 | Singh | |
| 12,175,381 B1 * | 12/2024 | Gupta | ................... G06N 3/045 |

(Continued)

FOREIGN PATENT DOCUMENTS

| | | |
|---|---|---|
| AU | 2021107043 A4 | 12/2021 |
| WO | 2011008361 A1 | 1/2011 |
| WO | 2021225528 A1 | 11/2021 |

OTHER PUBLICATIONS

VerÃ³nica BolÃ³n-Canedo, Amparo Alonso-Betanzos, Ensembles for feature selection: A review and future trends, Information Fusion, vol. 52, 2019, pp. 1-12, ISSN 1566-2535, https://doi.org/10.1016/j.inffus.2018.11.008. (Year: 2019).*

(Continued)

*Primary Examiner* — James T Tsai
(74) *Attorney, Agent, or Firm* — Konrad, Raynes, Davda & Victor, LLP; Janaki K. Davda

(57) ABSTRACT

Provided are techniques for enhancing silent features with adversarial networks for improved model versions. Input features are obtained. Hidden features are identified. Quantum feature importance scoring is performed to assign an importance score to each of the hidden features. Silent features are identified as the hidden features with the importance score below a first threshold. Important features are identified as the input features and as the hidden features with the importance score above a second threshold. A silent feature model is built using the silent features. An important feature model is built using the important features. An ensemble model is built with the silent feature model and the important feature model. The ensemble model is used to generate one or more predictions and one or more prescriptions.

20 Claims, 18 Drawing Sheets

(56) References Cited

U.S. PATENT DOCUMENTS

| | | | | |
|---|---|---|---|---|
| 12,339,904 | B2* | 6/2025 | Hunter | G06F 16/289 |
| 2021/0065059 | A1* | 3/2021 | Song | G06N 3/044 |
| 2023/0097628 | A1* | 3/2023 | Zeltyn | G06F 18/24323 |
| | | | | 714/37 |

OTHER PUBLICATIONS

Alexey Tsymbal, Mykola Pechenizkiy, PÃ;draig Cunningham, Diversity in search strategies for ensemble feature selection, Information Fusion, vol. 6, Issue 1, 2005, pp. 83-98, ISSN 1566-2535, https://doi.org/10.1016/j.inffus.2004.04.003. (Year: 2005).*

He, Zhimin, et al. "Quantum-enhanced feature selection with forward selection and backward elimination." Quantum Information Processing 17.7 (2018): 154. (Year: 2018).*

Sasahara, K., Shibata, M., Sasabe, H., Suzuki, T., Takeuchi, K., Umehara, K., & Kashiyama, E. (2021). Feature importance of machine learning prediction models shows structurally active part and important physicochemical features in drug design. Drug Metabolism and Pharmacokinetics, 39, 100401. (Year: 2021).*

Maya Gopal P. S. et al., Selection of Important Features for Optimizing Crop Yield Prediction, International Journal of Agricultural and Environmental Information Systems, Jul.-Sep. 2019, 18 pp.

Dhivya Elavarasan et al., A Hybrid CFS Filter and RF-RFE Wrapper-Based Feature Extraction for Enhanced Agricultural Crop Yield Prediction Modeling, Published: Sep. 11, 2020, 27 pp.

Punitha et al., An Effective Feature Selection With Generative Adversarial Network (GAN) Model for Stock Market Prediction, International Journal of Scientific & Technology Research, Dec. 2019, 8 pp.

Preprocessing for Neural Networks—Normalization Techniques, Posted Nov. 10, 2018, 4pp.

Mell, P. et al., Effectively and Securely Using the Cloud Computing Paradigm, [online], Oct. 7, 2009, retrieved from the Internet at http://csrc.nist.gov/groups/SNS/cloud-computing/cloud-computing-v26.ppt>, Total 80 pp.

Mell, P. et al., The NIST Definition of Cloud Computing (Draft), Sep. 2011, Computer Security Division Information Technology Laboratory National Institute of Standards and Technology, Total 7 pp.

Gamal El Masry et al., Recent Applications of Multispectral Imaging in Seed Phenotyping and Quality Monitoring—An Overview, Published: Mar. 4, 2019, 32 pp. (available at: https://www.mdpi.com/1424-8220/19/5/1090/htm).

Vojtech Havlicek, Supervised learning with quantum enhanced feature spaces, Dated: Jun. 5, 2018, 22 pp. (available at: https://arxiv.org/pdf/1804.11326.pdf).

Permutation feature importance, (c) 2007-2022, 3pp., retrieved from https://scikit-learn.org/stable/modules/permutation_importance.html).

Aaron Baughman et al., Large Scale Diverse Combinatorial Optimization: ESPN Fantasy Football Player Trades, last revised Apr. 19, 2022 (this version, v3), 16 pp. (available at: https://arxiv.org/abs/2111.02859).

Xiaodong Liu et al., Multi-level Feature Fusion based Conditional GAN for Underwater Image Color Correction, Feb. 13, 2020, 6 pp. (available at: https://arxiv.org/pdf/2002.05333.pdf).

Jie Hu et al., Squeeze-and-Excitation Networks, In Proceedings of the IEEE conference on computer vision and pattern recognition, 2018, 13 pp. (available at: https://arxiv.org/abs/1709.01507).

Kaiming He et al., Deep Residual Learning for Image Recognition, 2016 IEEE Conference on Computer Vision and Pattern Recognition, 2016, 9 pp.

Phillip Isola et al., Image-to-Image Translation with Conditional Adversarial Networks, Nov. 26, 2018, 17 pp. (available at https://arxiv.org/abs/1611.07004).

Ishaan Gulrajani et al., Improved Training of Wasserstein GANs, Dec. 25, 2017, 20 pp. (available at: https://arxiv.org/abs/1704.00028).

Patryk Hara et al., Selection of Independent Variables for Crop Yield Prediction Using Artificial Neural Network Models with Remote Sensing Data, 2021, 21 pp. (available at: https://www.mdpi.com/2073-445X/10/6/609/pdf).

Magdalena Piekutowska et al., The Application of Multiple Linear Regression and Artificial Neural Network Models for Yield Prediction of Very Early Potato Cultivars before Harvest, 2021, 17 pp. (available at: : https://www.mdpi.com/2073-4395/11/5/885/pdf).

Thomas van Klompenburg et al., Crop yield prediction using machine learning: A systematic literature review, 2020, 18 pp. (available at: https://www.sciencedirect.com/science/article/pii/S0168169920302301).

E. Manjula et al., A Model for Prediction of Crop Yield, 2017, 8 pp. (available at: http://www.periyaruniversity.ac.in/ijcii/issue/Vol6No4Mar2017/M5_PID0370_pdf).

Stephen Fashoto et al., Implementation of Machine Learning for Predicting Maize Crop Yields Using Multiple Linear Regression and Backward Elimination, 2021, 20 pp. (available at: https://www.researchgate.net/publication/349138613_IMPLEMENTATION_OF_MACHINE_LEARNING_FOR_PREDICTING_MAIZE_CROP_YIELDS_USING_MULTIPLE_LINEAR_REGRESSION_AND_BACKWARD_ELIMINATION).

Aditya Shastry et al., Prediction of Crop Yield Using Regression Techniques, 2017, 7 pp. (available at: https://hsat.space/wp-content/uploads/2020/08/Crop-Prediction-Using-Regressions-OCR.pdf).

Johnathon Shook et al., Crop yield prediction integrating genotype and weather variables using deep learning, Jun. 17, 2021, 19 pp. (available at: https://journals.plos.org/plosone/article?id=10.1371/journal.pone.0252402).

Verónica Saiz-Rubio et al., From Smart Farming towards Agriculture 5.0: A Review on Crop Data Management, Published: Feb. 3, 2020, 21 pp. (available at: https://www.mdpi.com/2073-4395/10/2/207).

Mulham Fawakherji et al., Data Augmentation Using GANs for Crop/Weed Segmentation in Precision Farming, 2020 IEEE Conference on Control Technology and Applications (CCTA), Aug. 24-26, 2020, 6 pp. (availalbe at: https://ieeexplore.ieee.org/document/9206297).

Luning Bi, Improving plant disease recognition with generative adversarial network under limited training set, (c) 2019, 35 pp. (available at: https://lib.dr.iastate.edu/cgi/viewcontent.cgi?article=8654&context=etd).

Mao et al., "Least Squares Generative Adversarial Networks", arXiv:1611.04076v3 [cs.CV], Apr. 5, 2017, 16 pages.

* cited by examiner

600

| out_group_avg_lo | group_avg_team | out_group_avg_o | out_group_avg | agv_perform | label | Accuracy | After Accuracy |
|---|---|---|---|---|---|---|---|
| 5.826052632 | 0.000698349 | 17.22807018 | -0.005600137 | -0.449602 | 0 | 90% | 60% |
| 5.826052632 | 0.000698349 | 17.22807018 | -0.005600137 | 0 | 0 | 90% | 60% |
| 5.826052632 | 0.000698349 | 17.22807018 | -0.005600137 | -0.0026972 | 0 | 90% | 60% |
| 5.826052632 | 0.000698349 | 17.22807018 | -0.005600137 | -0.0337618 | 0 | 90% | 60% |
| 1.687612245 | 0.001089536 | 17.93877551 | -0.017414851 | -0.0008401 | 1 | 90% | 60% |
| 1.687612245 | 0.001089536 | 17.93877551 | -0.017414851 | 0 | 1 | 90% | 60% |
| 1.687612245 | 0.001089536 | 17.93877551 | -0.017414851 | -0.0026972 | 1 | 90% | 60% |
| 1.687612245 | 0.001089536 | 17.93877551 | -0.017414851 | -0.0337618 | 1 | 90% | 60% |
| 9.12 | -0.000144394 | 19.2 | -0.051012176 | 0.00014488 | 1 | 90% | 60% |
| 9.12 | -0.000144394 | 19.2 | -0.051012176 | 0 | 1 | 90% | 60% |
| 7.440164706 | 0.000486432 | 19.43529412 | -0.012147752 | -0.449602 | 1 | 90% | 60% |
| 7.440164706 | 0.000486432 | 19.43529412 | -0.012147752 | -0.0043978 | 1 | 90% | 60% |
| 7.440164706 | 0.000486432 | 19.43529412 | -0.012147752 | 0 | 1 | 90% | 60% |
| 7.440164706 | 0.000486432 | 19.43529412 | -0.012147752 | 0 | 1 | 90% | 60% |
| 7.440164706 | 0.001269342 | 19.43529412 | -0.012147752 | -0.449602 | 1 | 90% | 60% |
| 7.440164706 | 0.001269342 | 19.43529412 | -0.012147752 | 0 | 1 | 90% | 60% |
| 7.440164706 | 0.001269342 | 19.43529412 | -0.012147752 | -8.00E-05 | 1 | 90% | 60% |

```
def quantum_feature_importance_model_build_run(self, X_train,
y_train,  X_test, y_test):
    ##MODEL BUILD import sys
    print("Recursive Limitation = ", sys.getrecursionlimit())

title = "qsvc_build_start:" + str(self.current_exp_number)
    self.objHelper.print_func(self.modelid, "DEBUG", title)

start_time = time.time()

quantum_estimator =
SVC(kernel=self.quantum_kernel_explict(X_train, y_train),
                        C=self.quantum_regularization_param)
    # fit the model print("\nModel Created  : ", quantum_estimator)
    end_time = time.time()
    elapsed = self.timer(start_time, end_time)

save model quantum_estimator title = "qsvc_build_end:" + str(self.current_exp_number)
    variabletuple = {elapsed, quantum_estimator}
    self.objHelper.print_func(self.modelid, "DEBUG", title,
variabletuple)
    ##MODEL BUILD

MODEL RUN title = "qsvc_fit_start:" + str(self.current_exp_number)

self.objHelper.print_func(self.modelid, "DEBUG", title)
```

```
    start_time = time.time()

quantum_estimator.fit(X_train, y_train)
    # print("\nModel Fitted   : ", quantum_estimator)
    end_time = time.time()
    elapsed = self.timer(start_time, end_time)
    # print(f"\nModel fitting Completed:  time taken :{elapsed}")
measuring time taken by function_2 title = "qsvc_fit_end:" + str(self.current_exp_number)
    variabletuple = {elapsed, quantum_estimator}
    self.objHelper.print_func(self.modelid, "INFO", title,
variabletuple)

# perform permutation importance
    #        y_train_test = quantum_estimator.predict(X_train)
    #        print("Model Prediction : ", y_train_test )
    start_time = time.time()
    # print("\nModel Started permutation_importance  : ")
    title = "qsvc_permutation_importance_start:" +
str(self.current_exp_number)
    self.objHelper.print_func(self.modelid, "INFO", title)

results = permutation_importance(quantum_estimator, X_test,
y_test,random_state=42, n_repeats=1,  n_jobs=self.n_parallel_jobs)
    end_time = time.time()
    elapsed = self.timer(start_time, end_time)

quantum_importance = results.importances_mean title = "qsvc_permutation_importance_end:" +
str(self.current_exp_number)
    variabletuple = {elapsed}
    self.objHelper.print_func(self.modelid, "INFO", title,
variabletuple)

MODEL RUN return quantum_importance, quantum_estimator
```

```
"accuracy.measures": {
    "quantum_technique": "QSVC",
    "quantum_train_accuracy": 0.9808882705479454,
    "quantum_test_accuracy": 0.855239726027397,
    "quantum_train_auc": 0.9884093631941846,
    "quantum_test_auc": 0.9011340714211847,
    "classical_technique": "XG_BOOST"
    "classical_train_accuracy": 0.9883005136986291,
    "classical.test.auc": 0.9873614362110862,
    "classical_train_auc": 0.9971596913800767,
    "classical_test_accuracy": 0.9884093631941846
}
```

Denote $F_{conv}$, $F_{copy}$, $F_{reshape}$, $F_{concat}$ as the convolution, copy, reshape and concatenate operations separately. The feature fusion follows the following operations as described in equations (1), (2), (3), (4). The output after the convolution may be denoted as:

$$f_{g1} = F_{conv}(f_g, W) \text{-----------------------------------------------} (1)$$

where W denotes the learnable weights.

For (2), $f_{g1}$ is copied in total $h_i \times w_i$ times:

$$f_{g2} = F_{copy}(f_{g1}, num = h_i \times w_i) \text{------------------------} (2)$$

For (3), $f_{g2}$ are reshaped into $(h_i, w_i, c_i)$:

$$f_{g3} = F_{reshape}(f_{g2}, size = (h_i, w_i, c_i)) \text{-----------------} (3)$$

For (4), feature fl and fg3 with the same dimensions are concatenated along the channel dimension:

$$f_{out} = F_{concat}(f_1, f_{g3}) \text{-------------------------------------} (4)$$

The fused feature $f_{out}$ is fed into the corresponding layer in the decoder with a skip connection.

FIG. 12

$$L_cWGAN\text{-}GP = E_{x,y}[D(x, y)] - E_x[D(x, G(x))] + \lambda E_{x1}[(\|x_1D(x_1)\|_2 - 1)^2] \text{------ (5)}$$

where x and y are the original data points and actual data points, x1 are the samples along the lines between the generated data G(x) and y, and λ stands for the weight factor.

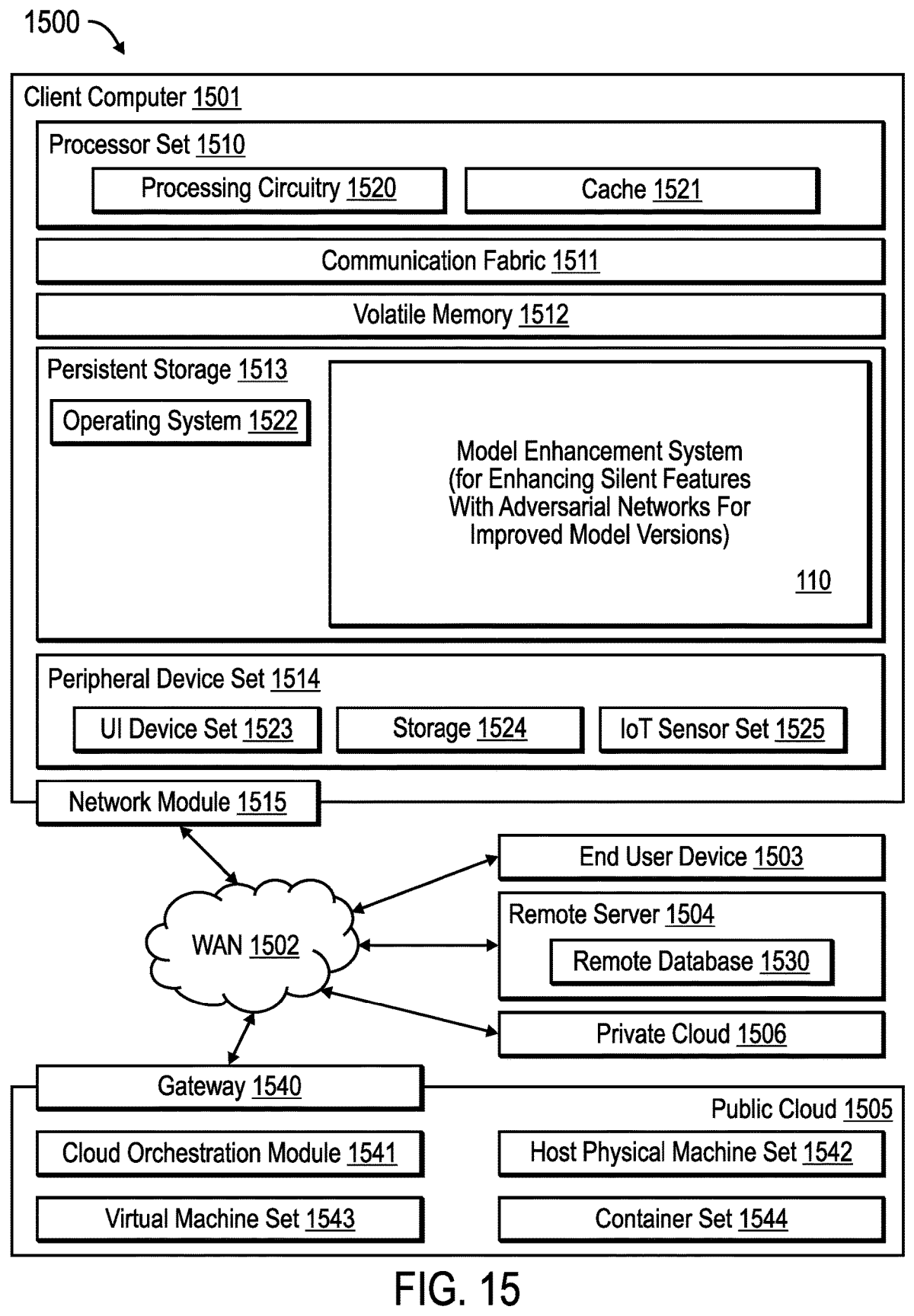

Client Computer 1501

Processor Set 1510

Processing Circuitry 1520          Cache 1521

Communication Fabric 1511

Volatile Memory 1512

Persistent Storage 1513

Operating System 1522

Model Enhancement System
(for Enhancing Silent Features
With Adversarial Networks For
Improved Model Versions)

110

Peripheral Device Set 1514

UI Device Set 1523          Storage 1524          IoT Sensor Set 1525

Network Module 1515

WAN 1502

End User Device 1503

Remote Server 1504

Remote Database 1530

Private Cloud 1506

Gateway 1540

Public Cloud 1505

Cloud Orchestration Module 1541          Host Physical Machine Set 1542

Virtual Machine Set 1543          Container Set 1544

FIG. 15

ENHANCING SILENT FEATURES WITH ADVERSARIAL NETWORKS FOR IMPROVED MODEL VERSIONS

BACKGROUND

Embodiments of the invention relate to enhancing silent features with adversarial networks for improved model versions.

While optimizing Artificial Intelligence (AI) based models, current solutions tend to use major features to formulate the AI based models but ignore the silent features. This results in underfitting of AI based models in testing, and often these AI based models are not able to deliver accurate predictions in the production environment.

SUMMARY

In accordance with certain embodiments, a computer-implemented method is provided for enhancing silent features with adversarial networks for improved model versions. The computer-implemented method comprises operations for: obtaining input features; identifying hidden features; performing quantum feature importance scoring to assign an importance score to each of the hidden features; identifying silent features as the hidden features with the importance score below a first threshold; identifying important features as the input features and as the hidden features with the importance score above a second threshold; building a silent feature model using the silent features; building an important feature model using the important features; building an ensemble model with the silent feature model and the important feature model; and using the ensemble model to generate one or more predictions and one or more prescriptions.

In accordance with other embodiments, a computer program product is provided for enhancing silent features with adversarial networks for improved model versions. The computer program product comprises a computer readable storage medium having program code embodied therewith, the program code executable by at least one processor to perform operations for: obtaining input features; identifying hidden features; performing quantum feature importance scoring to assign an importance score to each of the hidden features; identifying silent features as the hidden features with the importance score below a first threshold; identifying important features as the input features and as the hidden features with the importance score above a second threshold; building a silent feature model using the silent features; building an important feature model using the important features; building an ensemble model with the silent feature model and the important feature model; and using the ensemble model to generate one or more predictions and one or more prescriptions.

In accordance with yet other embodiments, a computer system is provided for enhancing silent features with adversarial networks for improved model versions. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations for: obtaining input features; identifying hidden features; performing quantum feature importance scoring to assign an importance score to each of the hidden features; identifying silent features as the hidden features with the importance score below a first threshold; identifying important features as the input features and as the hidden features with the importance score above a second threshold; building a silent feature model using the silent features; building an important feature model using the important features; building an ensemble model with the silent feature model and the important feature model; and using the ensemble model to generate one or more predictions and one or more prescriptions.

BRIEF DESCRIPTION OF THE SEVERAL VIEWS OF THE DRAWINGS

Referring now to the drawings in which like reference numbers represent corresponding parts throughout:

FIG. 6 illustrates an example of using the permutation importance technique in accordance with certain embodiments.

FIGS. 10A and 10B illustrate pseudo code in accordance with certain embodiments.

FIG. 11 illustrates results in terms of accuracy scores and feature importance scores in accordance with certain embodiments.

FIG. 12 illustrates convolution, copy, reshape and concatenate operations in accordance with certain embodiments.

FIG. 13 illustrates an operation for an example using a particular generative adversarial network in accordance with certain embodiments.

FIG. 15 illustrates a computing environment in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments provide a comprehensive way of integrating the important ("major" or "focused") and silent (i.e., "minor") features into a single model (i.e., an ensemble model).

Figure 1:
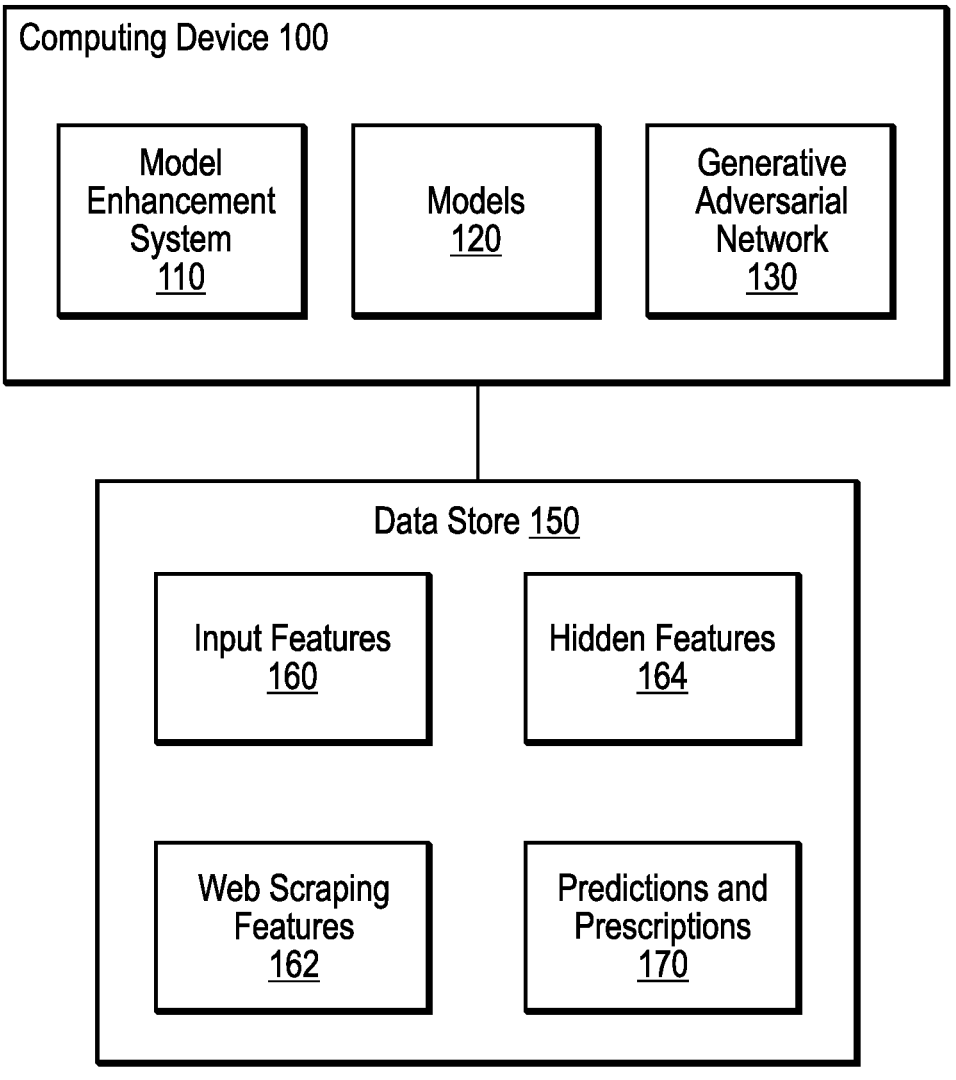
FIG. 1 illustrates, in a block diagram, a computing environment in accordance with certain embodiments.

FIG. 1 illustrates, in a block diagram, a computing environment in accordance with certain embodiments. A computing device 100 includes a model enhancement system 110, models 120, and a Generative Adversarial Network 130. The models 120 include at least a silent feature model, an important feature model, and an ensemble model. With embodiments, the silent feature model and the important feature model are used to form an ensemble model. The computing device 100 is connected to a data store 150. The data store includes input features 160, web scraping features 162, and hidden features 164. In addition, the data store includes predictions and prescriptions 170, which may be generated using the ensemble model.

Merely to enhance understanding, a farming example is provided. For example, in farming, using important features (without using silent features) to predict the yield and select the crop may give a suboptimal value (e.g., more yield, lower price or less yield, higher price). For optimized revenue, embodiments select both important features and silent features in such a way that the product of yield and price is maximized. The farming use case has several features/areas of interest to consider, such as:

What is the weather variation of this season?

What is the humidity level of the area of the farmland?

What type of crops needs what type of fertilizers?

What is the demand forecast of a particular crop in target time frame?

What is the farming spread of that particular crop in that target season in the surrounding area?

What is the effect of the previous season's crop on the soil and surrounding area for the target season etc.

Many of these aspects are interrelated and may be based on important features (e.g., weather forecasts, demand forecasts, etc.) and silent features.

Although conventional solutions in Data Science often ignore silent features, the model enhancement system 110 provides a Quantum Model Store, which is a configuration driven model builder platform that takes into account both silent features and important features. The model enhancement system 110 uses quantum feature importance scoring to solve the silent feature detection problem. The model enhancement system 110 applies and creates this in a farming use case to provide an example and enhance understanding. In this example, a farmer wants to select a crop to get maximum revenue by getting maximum yield and price by:

Using silent and important feature combinations from previous data;

Fetching features via web crawled data that may be time series based;

Using a conditional Generative Adversarial Network (cGAN) to produce new/hidden features; and Using a Quantum Model Store and quantum feature importance.

The model enhancement system 110 provides more accurate predictions and prescriptions by including the silent features in modelling. Predictions may be described as forecasts of what may happen based on past data, while prescription may be described as a recommendation to achieve a goal.

The model enhancement system 110 makes use of higher dimensional feature space using a quantum kernel function. A quantum kernel function calculates a kernel matrix, given datapoints x and y and feature map f, all of n dimension. The kernel matrix may be used in Quantum Machine Learning (QML). The model enhancement system 110 recognizes that the data points are better understood in a higher dimensional feature space through the use of the quantum kernel function. With embodiments, the quantum feature importance scoring allows consideration of silent features. The model enhancement system 110 increases the effect of prediction and prescription by inclusion of the silent features. For example, with reference to the farming example, the model enhancement system 110 may help increase revenue by detecting which featured seed to sow to get maximum yield and price with minimal cost.

Embodiments provide a Quantum Model Store. In such a version-controlled environment, the building versions of the silent feature model and the important feature model is configuration driven, and the resulting optimized model versions are stored and used for runtime predictions.

With embodiments, quantum feature importance scoring is newly done for silent feature detection. Embodiments use the Quantum Kernel for determining quantum feature importance scores for detecting silent features.

With embodiments, the conditional Generative Adversarial Network (cGAN) is used for detecting silent features to bridge the gap of unavailable data and hidden scaled data. Embodiments enable additive silent features computations with adversarial networks.

With reference to an ensemble model, to optimize the versions of the silent feature models and the important feature models, embodiments incorporate silent, hidden, and important features, thereby enhancing the overall performance of the ensemble model, which includes the silent features by normalizing and scaling on top of important features.

Embodiments perform versioning of less important models and more important models and iteratively find the best models inside the Quantum Model Store.

Figure 2A:
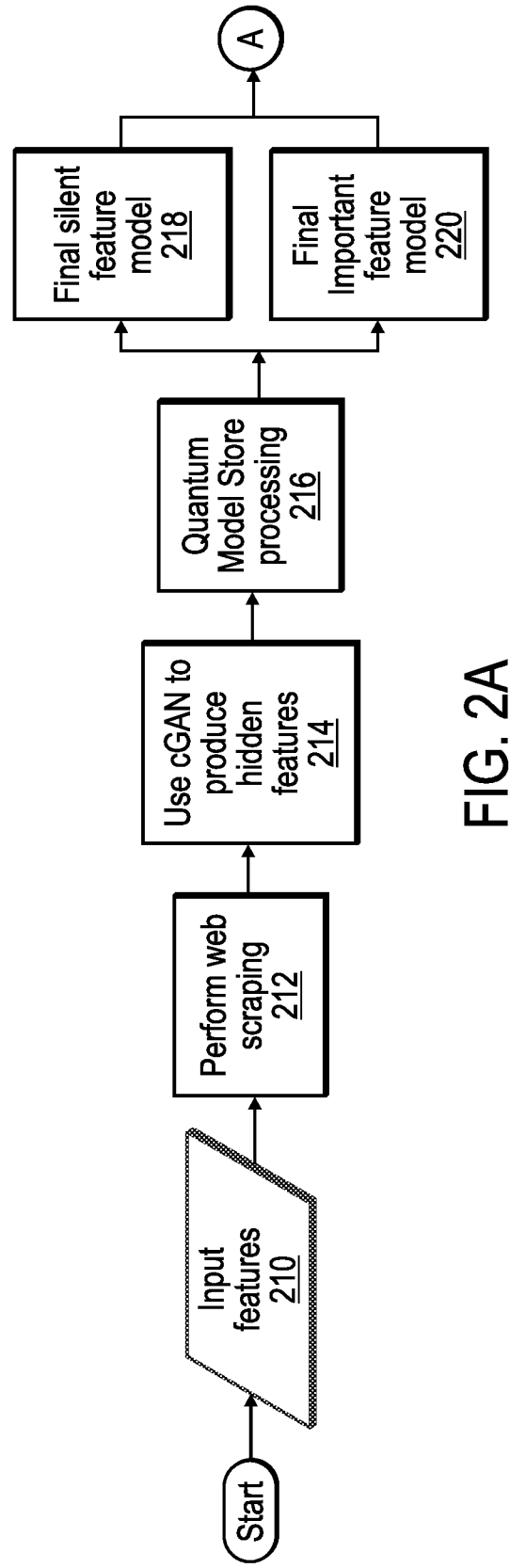
FIGS. 2A and 2B illustrate, in a flowchart, operations for creating an ensemble model with silent features and important features in accordance with certain embodiments.
Figure 2B:
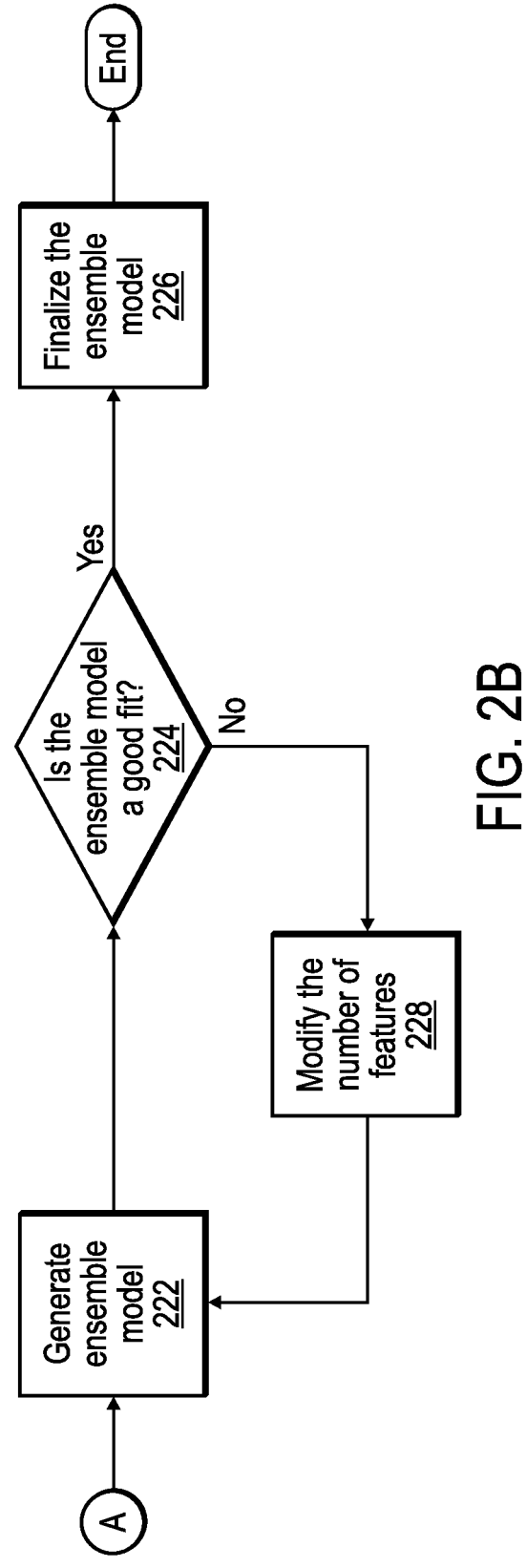

FIGS. 2A and 2B illustrate, in a flowchart, operations for creating an ensemble model with silent features and important features in accordance with certain embodiments. Control begins with the model enhancement system 110 receiving input features 210 (e.g., stored input features). For example, the input features 210 may include 25 features, such as weather variations, humidity level, etc. With embodiments, these input features are important features. These input features form the initial input dataset.

In block 212, the model enhancement system 110 performs web scraping (i.e., collecting additional features from a web search). For example, for features not included in the input features 210, the model enhancement system 110 may add 5 more features with web scraping of publicly available data. Then, the input dataset includes 30 features in total. With embodiments, these web scraping features are important features.

In block 214, the model enhancement system 110 uses cGAN to identify hidden features. With embodiments, the hidden features may be silent features or important features, depending on their feature importance scores. In certain embodiments, the model enhancement system 110 uses cGAN to leverage on the high-level features, with improvements being made for detection, segmentation, and pose estimation. Compared to the existing network structures, the model enhancement system 110 uses cGAN to extract more scales of features, and the global features are fused with minor features at each scale. The model enhancement system 110 is able to extract high-level information from the feature data with a receptive field of the entire dataset, which may be referred to as the global features.

The model enhancement system 110 uses cGAN to create additional features and uses the generator to generate a new feature set that is a combination of existing features and the new ones. For example, if the cGAN produced 10 new features, then the input dataset includes 40 features in total. In certain embodiments, the input features and the web scraped features are identified as important features. In other embodiments, the model enhancement system 110 generates a feature importance score for each of the features in the input dataset (i.e., the input features, the web scraped features, and the hidden features), and the silent and important features are identified from this input dataset based on their feature importance scores.

In block 216, the model enhancement system 110 performs the operations of the Quantum Model Store, which outputs a final silent feature model (block 218) for the ensembler and a final important feature model (block 220) for the ensembler. From blocks 218 and 220 (FIG. 2A), processing continues to block 222 (FIG. 2B).

In block 222, the model enhancement system 110 generates an ensemble model using the final silent feature model and the final important feature model (block 220). With embodiments, the model enhancement system 110 generates the ensemble model using a subset of the available features. In block 224, the model enhancement system 110 determines whether the ensemble model is a good fit. If so, processing continues to block 226, otherwise, processing continues to block 228. In certain embodiments, the model enhancement system 110 determines whether the ensemble model is a good fit based on statistics generated for the ensemble model.

In block 226, the model enhancement system 110 finalizes the ensemble model (i.e., by marking this as a final version of the ensemble model). In block 228, the model enhancement system 110 modifies the number of features (e.g., uses a different subset of the available features, which may be a different number of the available features) and processing continues to block 222.

Thus, the model enhancement system 110 works on combinations of features to get a final, ensemble model. The version of the silent feature model that is most accurate may be referred to as the silent feature version-model. The model enhancement system 110 ensembles the silent feature model (i.e., a first model or model 1) and the important feature model (i.e., a second model or model 2) to build the optimized final ensemble model.

With embodiments, the model enhancement system 110 builds an optimized final model of important features with one or more iterations of removing one or two important features to see which combination of important features provides the best accuracy. The final ensemble model is a combination of the silent feature model and the important feature model.

In certain embodiments, the model enhancement system 110 iteratively creates versions of the ensemble model until a version of the ensemble model is determined to be a good fit based on statistics generated for the ensemble feature model. The model enhancement system 110 may store one or more versions of the ensemble model in a Quantum Model Store in a computer device located in a cloud.

In certain embodiments, the model enhancement system 110 iteratively creates versions of the silent feature model until a version of the silent feature model is determined to be a good fit based on statistics generated for the silent feature model. In certain embodiments, the model enhancement system 110 iteratively creates versions of the important feature model until a version of the important feature model is determined to be a good fit based on statistics generated for the important feature model. The model enhancement system 110 may store one or more versions of the silent feature model and one or more versions of the important feature model in a Quantum Model Store in a computer device located in a cloud.

Figure 3:
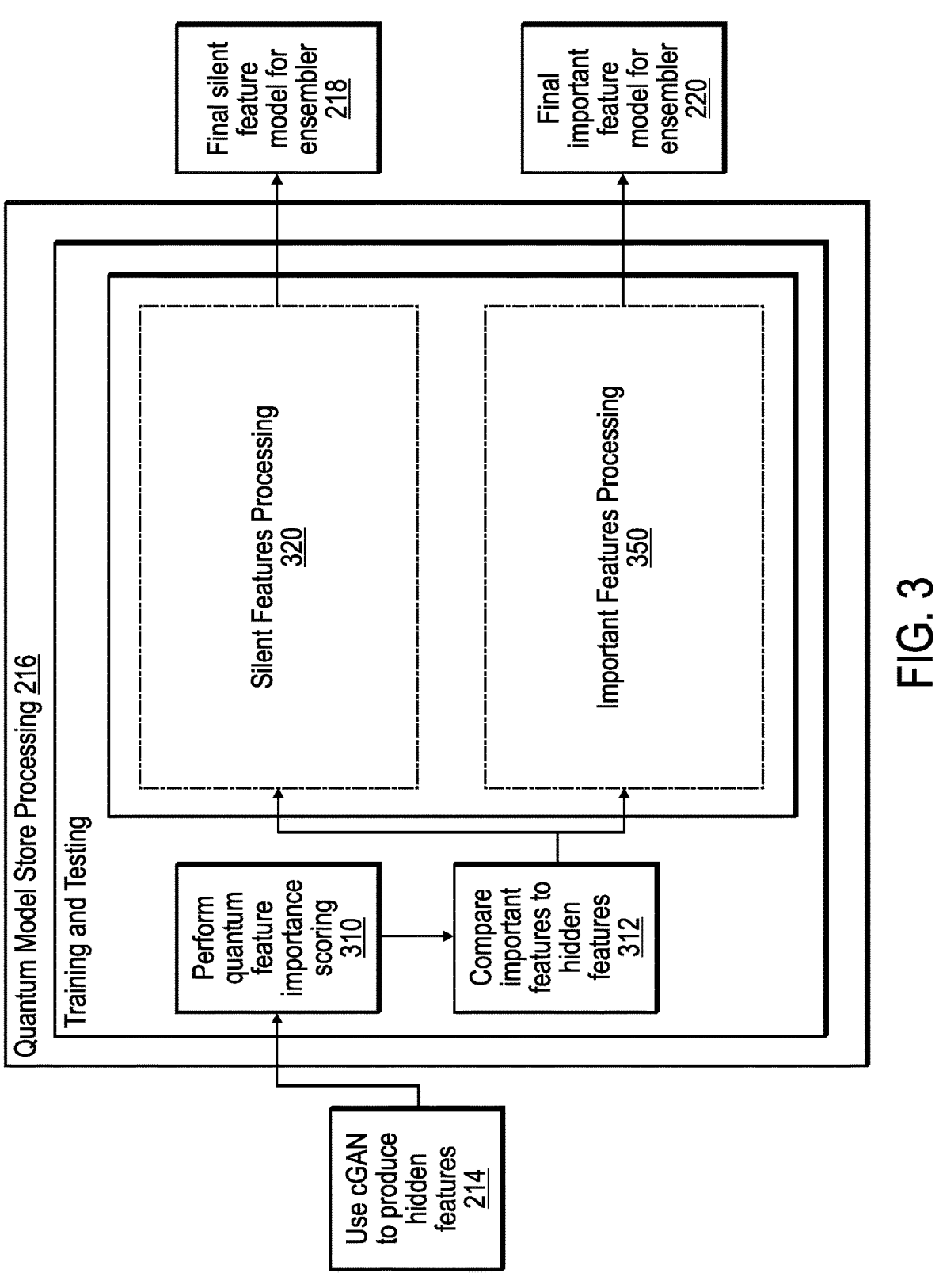
FIG. 3 illustrates details of a Quantum Model Store (QMS) in accordance with certain embodiments.

FIG. 3 illustrates details of Quantum Model Store processing 216 in accordance with certain embodiments. Within the Quantum Model Store processing 216, the model enhancement system 110 performs quantum feature importance scoring (block 310). Within the Quantum Model Store processing 216, the model enhancement system 110 compares important features to hidden features (block 312). In particular, the model enhancement system 110 compares the feature importance scores to identify which are the important features. Within the Quantum Model Store processing 216, the model enhancement system 110 processes silent features (block 320) to output the final silent feature model (block 218). Within the Quantum Model Store processing 216, the model enhancement system 110 processes important features (block 350) to output the final important feature model (block 220).

Figure 4:
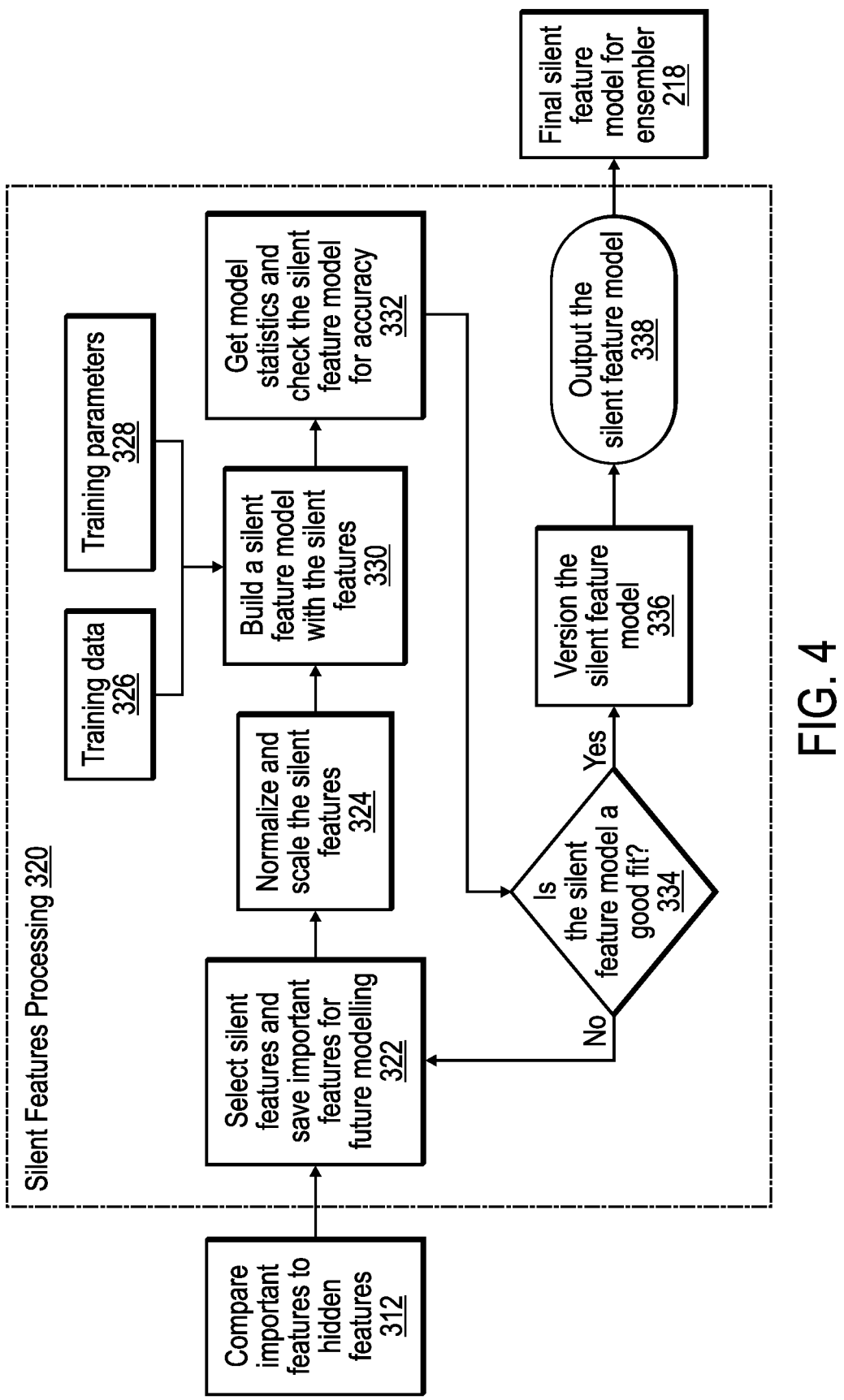
FIG. 4 illustrates, in a flowchart, operations for creating a final silent feature model in accordance with certain embodiments.

FIG. 4 illustrates, in a flowchart, operations for creating a final silent feature model in accordance with certain embodiments. For processing silent features (block 320), the model enhancement system 110 selects silent features and saves important features for future modelling (block 322). In certain embodiments, a subset of the silent features is selected in block 322.

In block 324, the model enhancement system 110 normalizes and scales the silent features. There are different types of scaling. In certain embodiments, scaling refers to using a Tan H function to scale the silent features. In block 330, the model enhancement system 110 builds a silent feature model with the silent features using training data 326 and training parameters 328. In block 332, the model enhancement system 110 gets model statistics and checks the silent feature model for accuracy. In block 334, the model enhancement system 110 determines whether the silent feature model is a good fit based on the accuracy. If so, processing continues to block 336, otherwise, processing continues to block 322. With embodiments, a subset of the silent features is selected initially in block 322, and, if processing returns to block 322, a different subset of the silent features, which may be a different number of the silent features, is selected. In certain embodiments, the model enhancement system 110 determines whether the silent feature model is a good fit based on the statistics generated for the silent feature model.

In block 336, the model enhancement system 110 versions the silent feature model (i.e., creates a new version of the silent feature model). In block 338, the model enhancement system 110 outputs the silent feature model.

In particular, with reference to important features versus silent features, with a repetition loop, the model enhancement system 110 builds a model for silent features and versions the model. In addition, the model enhancement system 110 enhances the silent features. For example, for the 40 features in the input dataset and the feature importance scores, the model enhancement system 110 may identify the silent features as having a feature importance score below a first threshold (e.g., a feature importance score<0.0003).

Unlike conventional systems that ignore the silent features, the model enhancement system 110 uses the silent features to improve models.

The model enhancement system 110 may identify the important features as having a feature importance score greater than (or greater than or equal to) a second threshold. The model enhancement system 110 removes the important features and saves these important features for other processing. In certain embodiments, the first threshold and the second threshold are the same value, while, in other embodiments, the first threshold and the second threshold are different values.

With embodiments, the model enhancement system 110 applies two processes to the silent features: 1) normalizing and 2) scaling to increase the value of the silent features. Then, the model enhancement system 110 has normalized and scaled silent features.

Then, the model enhancement system 110 builds a silent feature model and versions this silent feature model (e.g., by dropping the columns of important features, where this may be done with a pickle file or an H5 file for features f1-f40).

The model enhancement system 110 repeats the processing of block 322-334 until a good model is built with better scores and with silent features detected. Then, this silent feature model is versioned.

Figure 5:
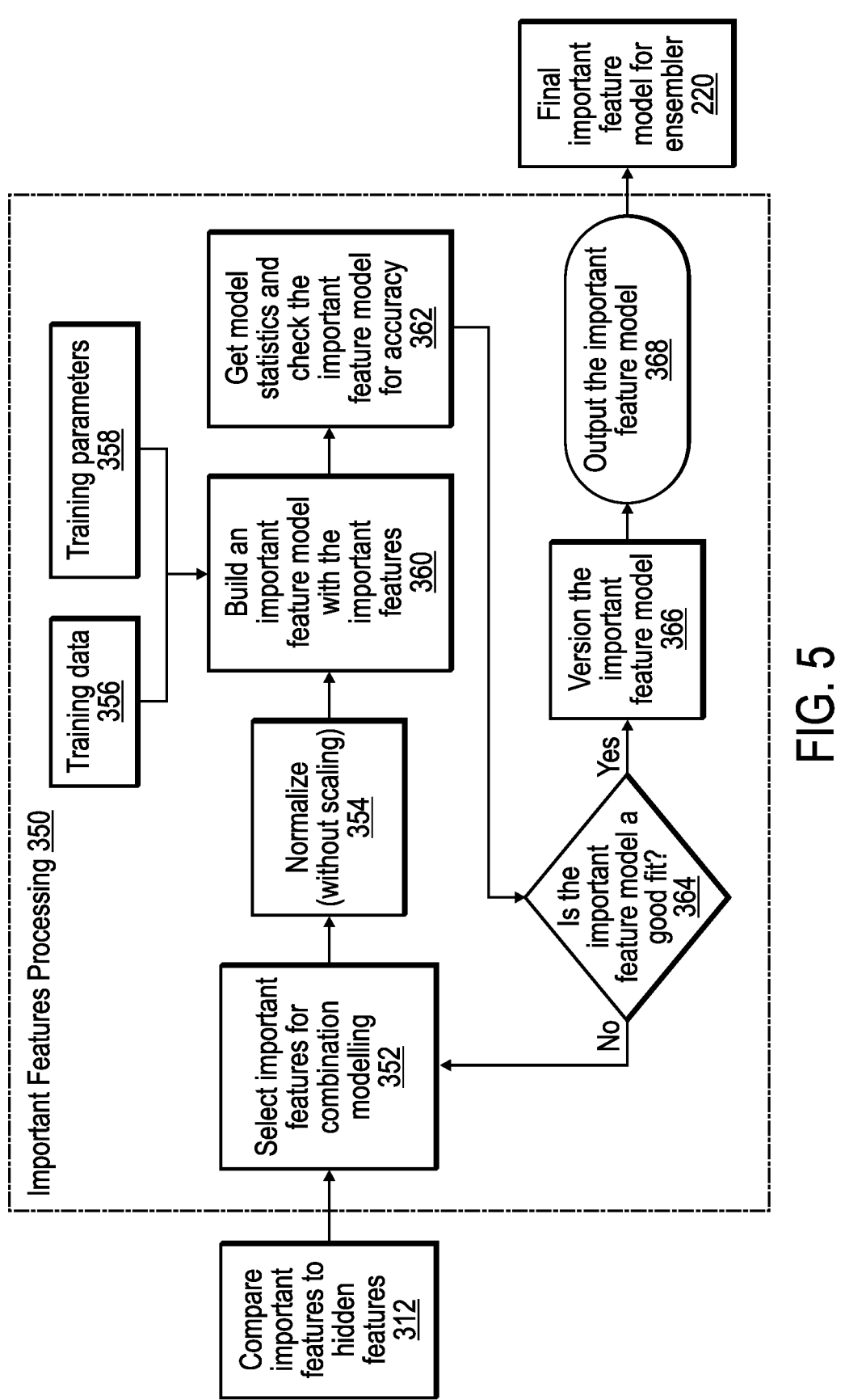
FIG. 5 illustrates, in a flowchart, operations for creating a final important feature model in accordance with certain embodiments.

FIG. 5 illustrates, in a flowchart, operations for creating a final important feature model in accordance with certain embodiments. For processing important features (block 350), the model enhancement system 110 selects important features for combination modelling (block 352). In block 354, the model enhancement system 110 normalizes the important features and scaling is not performed. In block 360, the model enhancement system 110 builds an important feature model with the important features using training data 356 and training parameters 358. In block 362, the model enhancement system 110 gets model statistics and checks the important feature model for accuracy. In block 364, the model enhancement system 110 determines whether the important feature model is a good fit based on the accuracy. If so, processing continues to block 366, otherwise, processing continues to block 352. With embodiments, a subset of the important features is selected initially in block 352, and, if processing returns to block 352, a different subset of the important features which may be a different number of the important features, is selected. In certain embodiments, the model enhancement system 110 determines whether the important feature model is a good fit based on the statistics generated for the important feature model.

In block 366, the model enhancement system 110 versions the important feature model (i.e., creates a new version of the important feature model). In block 368, the model enhancement system 110 outputs the important feature model.

After versioning, the model enhancement system 110 may use the Quantum Model Store to store the versioned silent feature model and the versioned important feature model. In certain embodiments, the Quantum Model Store is part of a cloud-based solution for a version-controlled environment, and the resulting silent feature models and important feature models are stored and used for runtime predictions. For example, versions of the silent feature models and the important feature models are stored in the Quantum Model Store in a computer (e.g., computing device 100) located in the cloud.

FIGS. 6-9 illustrate details of performing quantum feature importance scoring (block 310). In certain embodiments, the model enhancement system 110 determines the feature importance score for each feature using a permutation importance technique. FIG. 6 illustrates an example 600 of using the permutation importance technique in accordance with certain embodiments. Permutation feature importance may be described as a model inspection technique that may be used for any fitted estimator when the data is tabular. The permutation feature importance may be defined to be the decrease in a model score when a single feature value is randomly shuffled. The permutation importance technique breaks the relationship between the feature and the target, thus the drop in the model score is indicative of how much the model depends on that feature. The permutation importance technique benefits from being model agnostic and may be calculated many times with different permutations of the feature set.

In certain embodiments, the model enhancement system 110 uses Quantum Support Vector Machine (SVM) as the classification technique, but in other embodiments, the model enhancement system 110 may use other classification techniques. The model enhancement system 110 solves the silent feature detection problem using both the permutation importance technique and the Quantum SVM. Unlike conventional systems, the model enhancement system 110 performs quantum feature importance scoring for silent feature detection. With embodiments, the model enhancement system 110 uses a Quantum Kernel for determining quantum feature importance scores. The model enhancement system 110 may use Neural Net models of Variational Quantum solvers to randomly assign weights to determine whether a particular feature added to the input dataset made any difference to the silent feature model.

Figure 7:
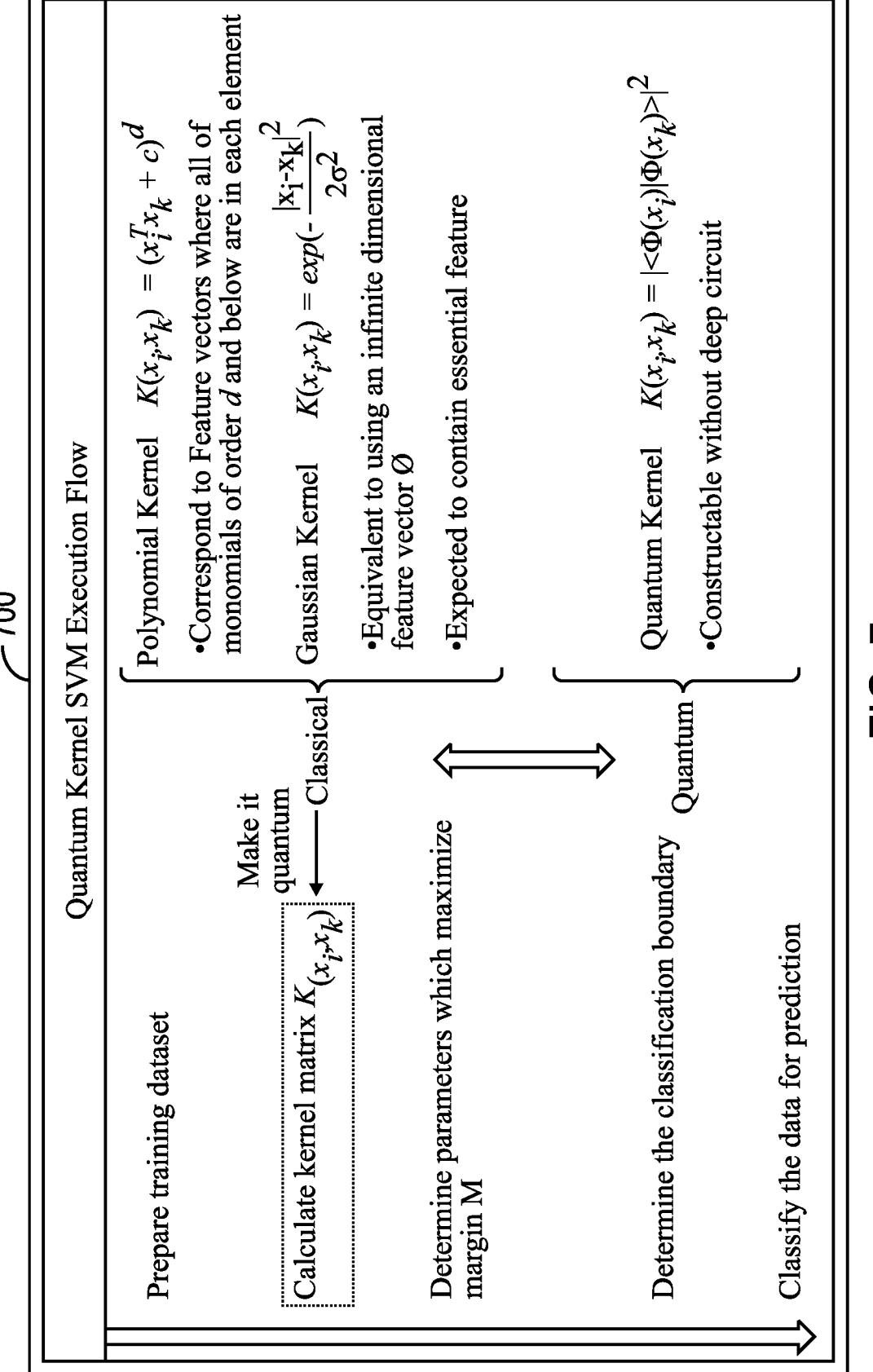
FIG. 7 illustrates a Quantum Kernel Support Vector Machine (SVM) execution flow in accordance with certain embodiments.

FIG. 7 illustrates a Quantum Kernel SVM execution flow 700 in accordance with certain embodiments. In this execution flow 700, a training dataset of features is prepared. A kernel matrix is calculated. Parameters to maximize a margin are determined. The classification boundary is determined. Then, the features in the training dataset are classified for prediction.

Figure 8:
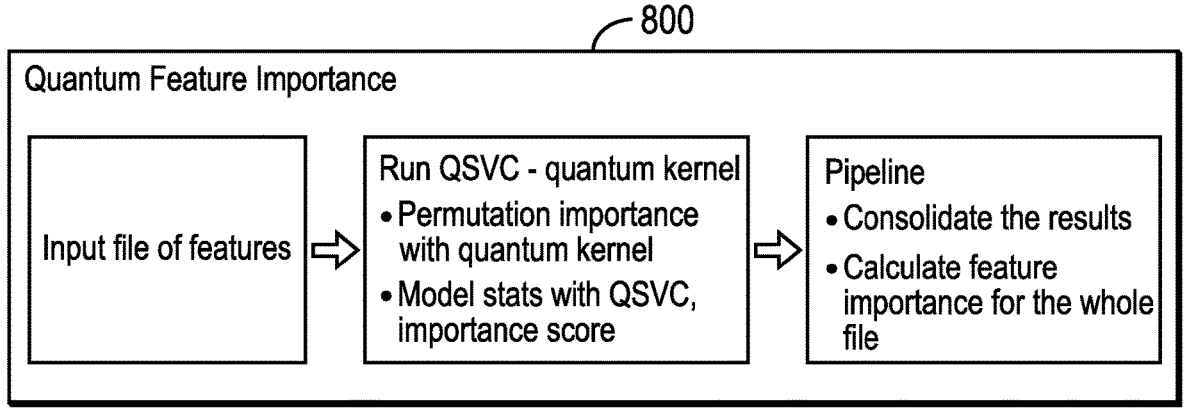
FIG. 8 illustrates a quantum feature importance flow in accordance with certain embodiments.

FIG. 8 illustrates a quantum feature importance flow 800 in accordance with certain embodiments. In the quantum feature importance flow 800, the model enhancement system 110 receives an input file of features. Then, the model enhancement system 110 runs Quantum SVC (QSVC) with permutation importance with the quantum kernel and receives model statistics with the Quantum SVC that include a feature importance score for each of the features in the input file. Then, the model enhancement system 110 consolidates the results and calculates the feature importance for the input file as a whole.

Figure 9:
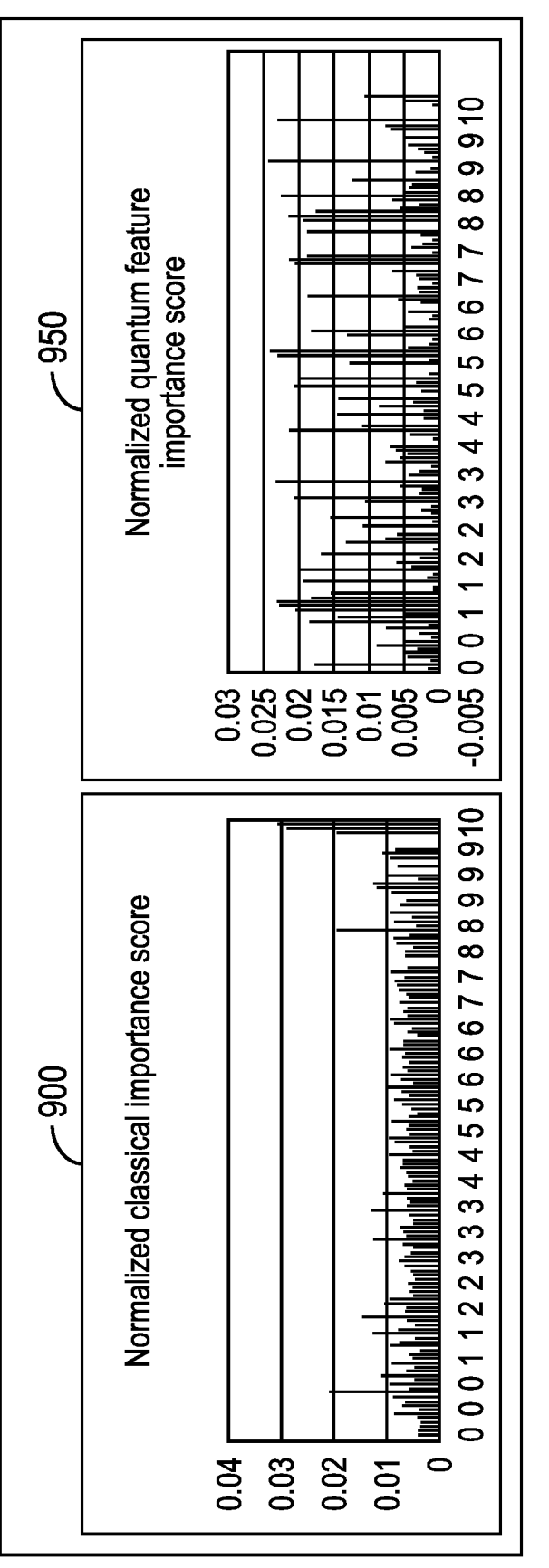
FIG. 9 illustrates experimental results in accordance with certain embodiments.

FIG. 9 illustrates experimental results 900, 950 in accordance with certain embodiments. In FIG. 9, experimental results 900 are for a normalized classical importance score, and experimental results 950 are for a normalized quantum feature importance score. In the example of FIG. 9, the experimental results illustrate feature importance scores from an eXtreme Gradient Boosting (XGBoost) technique and are uniform across the dataset, where the features which have a higher range of feature importance scores have been scaled up, and features which have a lower range of feature importance scores have been scaled up to show some prescence. With this, the model enhancement system 110 detects silent features among salient features.

FIGS. 10A and 10B illustrate pseudo code 1000, 1050 in accordance with certain embodiments. The pseudo code 1000, 1050 represents code to generate the feature importance scores.

FIG. 11 illustrates results 1100 in terms of accuracy scores and feature importance scores in accordance with certain embodiments. In particular, these scores are provided for the quantum technique and the classical technique.

In certain embodiments, the cGAN consists of the one generator G and one discriminator D, and the cGAN is initially deployed to produce the features given noise input z. The generator G aims to produce features to fool the discriminator D, and the discriminator D is trained to distinguish samples from real features, where the generator G and the discriminator D are updated in an adversarial fashion. The cGAN is slightly different from the basic GAN in that the cGAN takes conditional variables as inputs.

In certain embodiments, the generator G is based on an encode-decoder structure with a multi-scale feature extraction and feature fusion unit, which are designed and integrated in a new way.

With embodiments, for global features and multi-level local features extraction, the extraction of global features is prevalent in feature engineering and may be achieved by average pooling along the spatial dimension. Unlike the average pooling typically used, embodiments extract the global features by gradually down-sampling the input data with convolution layers until the output has a dimension $1 \times 1 \times c_g$, where $c_g$ represents the number of channels of global features. The benefits of gradually down-sampling compared to simple average pooling are two folds: first, the number of feature maps are free to be chosen, and, second, in this way, more scales of local features may be extracted simultaneously. As the encoder part of the generator G functions as feature extraction, and to make the network deeper and easier to optimize, the residual building blocks are employed for determining features and feature importance.

With reference to fusion of the global and local features unit, with embodiments the feature fusion unit dynamically fuses the global features with local features. For example, the local feature map $f_1$ is at scale i with dimension $h_i \times w_i \times c_i$, and the global features $f_g$ have dimensions $1 \times 1 \times c_g$. The global features are first adjusted through a $1 \times 1$ convolution layer with learnable weights for channel matching. Normally, $c_g$ is larger than $c_i$, therefore, this operation is designed to adaptively extract the most useful information from global features for local features at scale i. The parameter settings for this convolution layer are: kernel size $1 \times 1$, stride 1, number of input channels $c_g$ and number of output channels $c_i$.

FIG. 12 illustrates convolution, copy, reshape and concatenate operations 1200 in accordance with certain embodiments. In FIG. 12, $F_{conv}$, $F_{copy}$, $F_{reshape}$, and $F_{concat}$ are the separate convolution, copy, reshape, and concatenate operations. The feature fusion unit follows the operations as described in equations (1), (2), (3), (4) of FIG. 12.

In certain embodiments, PatchGAN is adopted as the discriminator D. PatchGAN is designed to identify whether each N×N data set is real or generated by the generator G, and the overall decision is achieved by averaging the authenticity of all data points. In this case, the generated data is considered with high probability to be real when nearly all data points are generated with good scale (i.e., the major and minor features are of almost the same scale). Considering the network is trained in an adversarial way, the generator G is pushed to focus more on high frequency (i.e., same data point) and generate a better data set so as to fool the discriminator D. On the other hand, compared to the whole-discriminator, less convolutional layers are needed for PatchGAN.

With embodiments, the model enhancement system 110 uses cGAN. The model enhancement system 110 finds hidden features by cGAN using generator G and discriminator D, with PatchGAN (as in D [i]), with scale i.

FIG. 13 illustrates an operation 1300 for an example using a particular generative adversarial network in accordance with certain embodiments. With embodiments, the particular generative adversarial network is the Wasserstein GAN+ Gradient Penalty (WGAN-GP). With embodiments, with reference to an objective function, the WGAN-GP loss is adopted and modified into the conditional setting as the adversarial loss. Embodiments apply AI and analysis to aggregated field, machine and environmental data to improve shared insights, for example, between growers and enterprises across the agriculture ecosystem.

For example, in the agriculture space, embodiments are able to send out forecasts about weather conditions, suggest crops to be cultivated for maximum profitability, and provide unique agronomical business insights.

The ensemble model provided by embodiments may be used in various areas. For example, the ensemble model may be used in agriculture, supply chain, forecasting etc.

With embodiments, the operations of the Quantum Object Store and/or the operations of FIGS. 2A-2B may be offered as services (e.g., cloud services).

In certain embodiments, the model enhancement system 110 uses silent and important feature combinations from previously stored input features and from time series web crawled features to build two models, the first for silent features and the second for important features. The model enhancement system 110 builds an ensemble model to make use of the silent features and the important features.

Figure 14A:
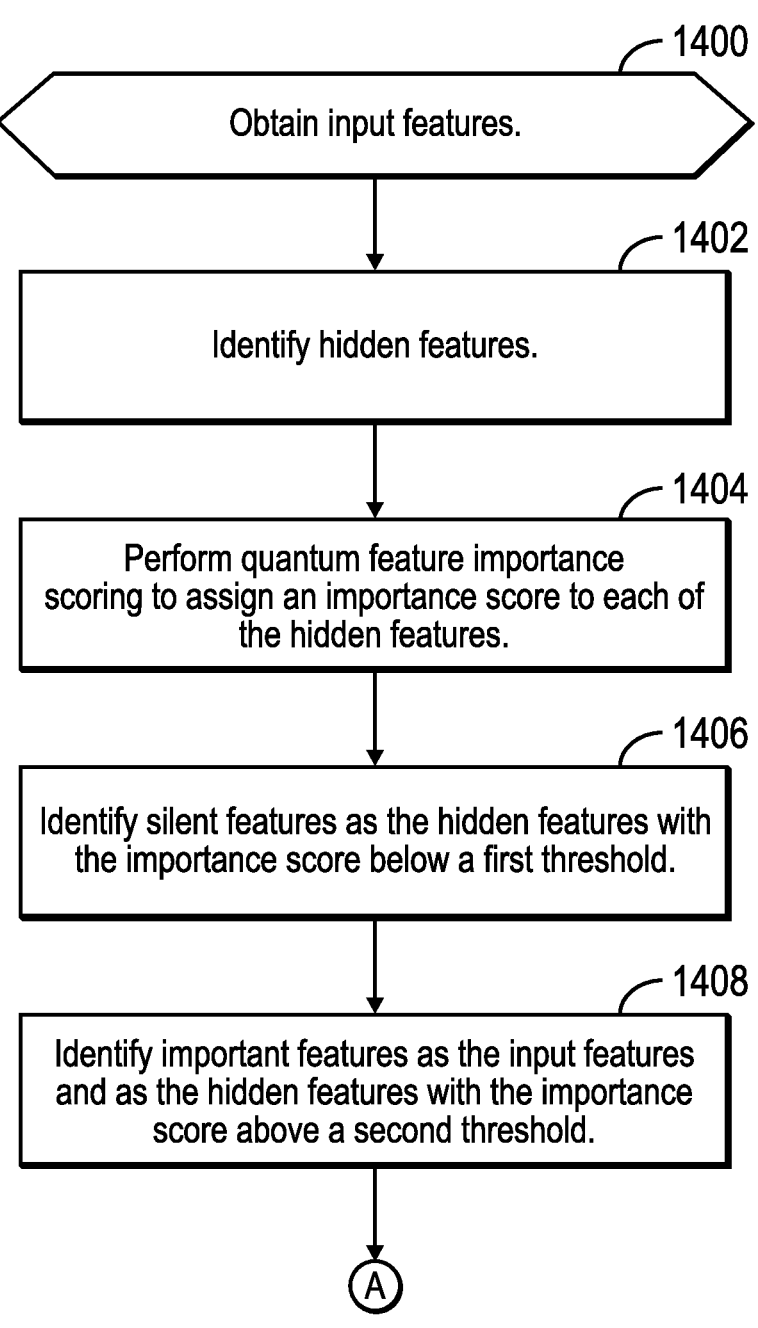
FIGS. 14A and 14B illustrated, in a flowchart, operations for enhancing silent features with adversarial networks for improved model versions.
Figure 14B:
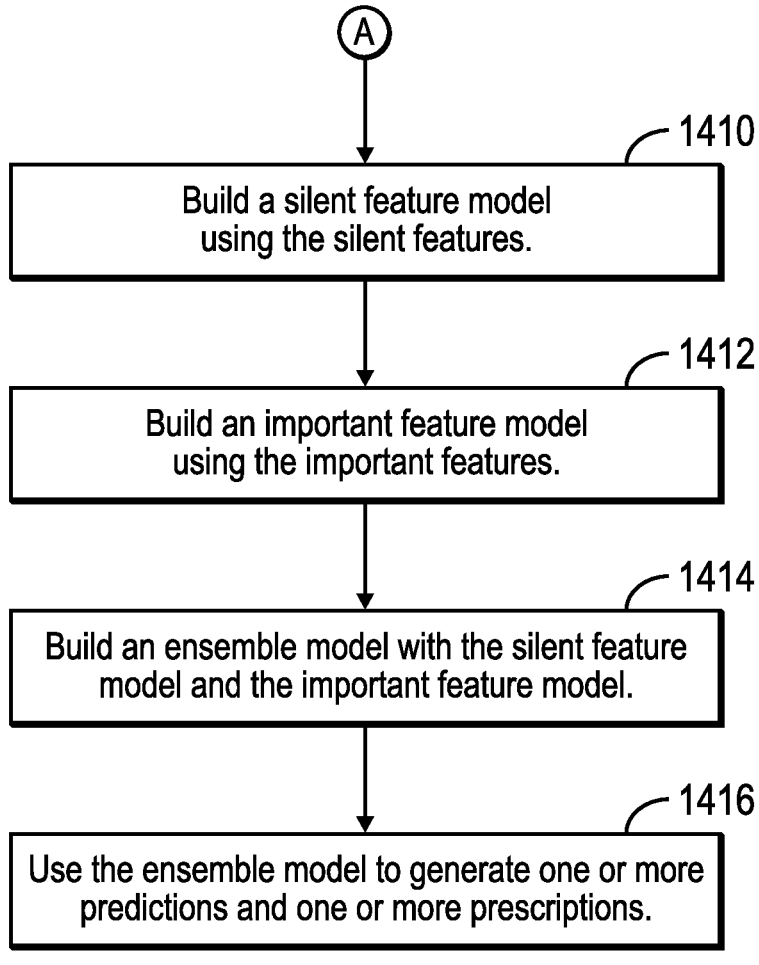

FIGS. 14A and 14B illustrated, in a flowchart, operations for enhancing silent features with adversarial networks for improved model versions. Control begins at block 1400 with the model enhancement system 110 obtaining input features. In block 1402, the model enhancement system 110 identifies hidden features. In block 1404, the model enhancement system 110 performs quantum feature importance scoring to assign an importance score to each of the hidden features. In block 1406, the model enhancement system 110 identifies silent features as the hidden features with the importance score below a first threshold. In block 1408, the model enhancement system 110 identifies important features as the input features and as the hidden features with the importance score above a second threshold. From block 1408 (FIG. 14A), processing continues to block 1410 (FIG. 14B).

In block 1410, the model enhancement system 110 builds a silent feature model using the silent features. In block 1412, the model enhancement system 110 builds an important feature mode using the important features. In block 1414, the model enhancement system 110 builds an ensemble model with the silent feature model and the important feature model. In block 1416, the model enhancement system 110 uses the ensemble model to generate one or more predictions and one or more prescriptions.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 15 illustrates a computing environment 1500 in accordance with certain embodiments. Computing environment 1500 contains an example of an environment for the execution of at least some of the computer code involved in performing the inventive methods, such as model enhancement system 110 (for enhancing silent features with adversarial networks for improved model versions). In addition to block 110, computing environment 1500 includes, for example, computer 1501, wide area network (WAN) 1502, end user device (EUD) 1503, remote server 1504, public cloud 1505, and private cloud 1506. In this embodiment, computer 1501 includes processor set 1510 (including processing circuitry 1520 and cache 1521), communication fabric 1511, volatile memory 1512, persistent storage 1513 (including operating system 1522 and block 110, as identified above), peripheral device set 1514 (including user interface (UI) device set 1523, storage 1524, and Internet of Things (IoT) sensor set 1525), and network module 1515. Remote server 1504 includes remote database 1530. Public cloud 1505 includes gateway 1540, cloud orchestration module 1541, host physical machine set 1542, virtual machine set 1543, and container set 1544.

COMPUTER 1501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1530. As is well understood in the art of computer technology, and depending upon the technology, performance of a computer-implemented method may be distributed among multiple computers and/or between multiple locations. On the other hand, in this presentation of computing environment 1500, detailed discussion is focused on a single computer, specifically computer 1501, to keep the presentation as simple as possible. Computer 1501 may be located in a cloud, even though it is not shown in a cloud in FIG. 15. On the other hand, computer 1501 is not required to be in a cloud except to any extent as may be affirmatively indicated.

PROCESSOR SET 1510 includes one, or more, computer processors of any type now known or to be developed in the future. Processing circuitry 1520 may be distributed over multiple packages, for example, multiple, coordinated integrated circuit chips. Processing circuitry 1520 may implement multiple processor threads and/or multiple processor cores. Cache 1521 is memory that is located in the processor chip package(s) and is typically used for data or code that should be available for rapid access by the threads or cores running on processor set 1510. Cache memories are typically organized into multiple levels depending upon relative proximity to the processing circuitry. Alternatively, some, or all, of the cache for the processor set may be located "off chip." In some computing environments, processor set 1510 may be designed for working with qubits and performing quantum computing.

Computer readable program instructions are typically loaded onto computer 1501 to cause a series of operational steps to be performed by processor set 1510 of computer 1501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1521 and the other storage media discussed below. The program instructions, and associated data, are accessed by processor set 1510 to control and direct performance of the inventive methods. In computing environment 1500, at least some of the instructions for performing the inventive methods may be stored in block 110 in persistent storage 1513.

COMMUNICATION FABRIC 1511 is the signal conduction path that allows the various components of computer 1501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1512 is any type of volatile memory now known or to be developed in the future. Examples include dynamic type random access memory (RAM) or static type RAM. Typically, volatile memory 1512 is characterized by random access, but this is not required unless affirmatively indicated. In computer 1501, the volatile memory 1512 is located in a single package and is internal to computer 1501, but, alternatively or additionally, the volatile memory may be distributed over multiple packages and/or located externally with respect to computer 1501.

PERSISTENT STORAGE 1513 is any form of non-volatile storage for computers that is now known or to be developed in the future. The non-volatility of this storage means that the stored data is maintained regardless of whether power is being supplied to computer 1501 and/or directly to persistent storage 1513. Persistent storage 1513 may be a read only memory (ROM), but typically at least a portion of the persistent storage allows writing of data, deletion of data and re-writing of data. Some familiar forms of persistent storage include magnetic disks and solid state storage devices. Operating system 1522 may take several forms, such as various known proprietary operating systems or open source Portable Operating System Interface-type operating systems that employ a kernel. The code included in block 110 typically includes at least some of the computer code involved in performing the inventive methods.

PERIPHERAL DEVICE SET 1514 includes the set of peripheral devices of computer 1501. Data communication connections between the peripheral devices and the other components of computer 1501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1523 may include components such as a display screen, speaker, microphone, wearable devices (such as goggles and smart watches), keyboard, mouse, printer, touchpad, game controllers, and haptic devices. Storage 1524 is external storage, such as an external hard drive, or insertable storage, such as an SD card. Storage 1524 may be persistent and/or volatile. In some embodiments, storage 1524 may take the form of a quantum computing storage device for storing data in the form of qubits. In embodiments where computer 1501 is required to have a large amount of storage (for example, where computer 1501 locally stores and manages a large database) then this storage may be provided by peripheral storage devices designed for storing very large amounts of data, such as a storage area network (SAN) that is shared by multiple, geographically distributed computers. IoT sensor set 1525 is made up of sensors that can be used in Internet of Things applications. For example, one sensor may be a thermometer and another sensor may be a motion detector.

NETWORK MODULE 1515 is the collection of computer software, hardware, and firmware that allows computer 1501 to communicate with other computers through WAN 1502. Network module 1515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1515 are performed on the same physical hardware device. In other embodiments (for example, embodiments that utilize software-defined networking (SDN)), the control functions and the forwarding functions of network module 1515 are performed on physically separate devices, such that the control functions manage several different network hardware devices. Computer readable program instructions for performing the inventive methods can typically be downloaded to computer 1501 from an external computer or external storage device through a network adapter card or network interface included in network module 1515.

WAN 1502 is any wide area network (for example, the internet) capable of communicating computer data over non-local distances by any technology for communicating computer data, now known or to be developed in the future. In some embodiments, the WAN 1502 may be replaced and/or supplemented by local area networks (LANs)

designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1503 is any computer system that is used and controlled by an end user (for example, a customer of an enterprise that operates computer 1501), and may take any of the forms discussed above in connection with computer 1501. EUD 1503 typically receives helpful and useful data from the operations of computer 1501. For example, in a hypothetical case where computer 1501 is designed to provide a recommendation to an end user, this recommendation would typically be communicated from network module 1515 of computer 1501 through WAN 1502 to EUD 1503. In this way, EUD 1503 can display, or otherwise present, the recommendation to an end user. In some embodiments, EUD 1503 may be a client device, such as thin client, heavy client, mainframe computer, desktop computer and so on.

REMOTE SERVER 1504 is any computer system that serves at least some data and/or functionality to computer 1501. Remote server 1504 may be controlled and used by the same entity that operates computer 1501. Remote server 1504 represents the machine(s) that collect and store helpful and useful data for use by other computers, such as computer 1501. For example, in a hypothetical case where computer 1501 is designed and programmed to provide a recommendation based on historical data, then this historical data may be provided to computer 1501 from remote database 1530 of remote server 1504.

PUBLIC CLOUD 1505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1505 is performed by the computer hardware and/or software of cloud orchestration module 1541. The computing resources provided by public cloud 1505 are typically implemented by virtual computing environments that run on various computers making up the computers of host physical machine set 1542, which is the universe of physical computers in and/or available to public cloud 1505. The virtual computing environments (VCEs) typically take the form of virtual machines from virtual machine set 1543 and/or containers from container set 1544. It is understood that these VCEs may be stored as images and may be transferred among and between the various physical machine hosts, either as images or after instantiation of the VCE. Cloud orchestration module 1541 manages the transfer and storage of images, deploys new instantiations of VCEs and manages active instantiations of VCE deployments. Gateway 1540 is the collection of computer software, hardware, and firmware that allows public cloud 1505 to communicate through WAN 1502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1506 is similar to public cloud 1505, except that the computing resources are only available for use by a single enterprise. While private cloud 1506 is depicted as being in communication with WAN 1502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1505 and private cloud 1506 are both part of a larger hybrid cloud.

ADDITIONAL EMBODIMENT DETAILS

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

In the described embodiment, variables a, b, c, i, n, m, p, r, etc., when used with different elements may denote a same or different instance of that element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:
   obtaining input features of a first number of features;
   identifying hidden features of a second number of new features;
   performing quantum feature importance scoring to assign an importance score to each of the input features and to each of the hidden features, wherein the quantum feature importance scoring uses a permutation importance technique;
   identifying silent features as the hidden features with the importance score below a first threshold;
   identifying important features as the input features with the importance score above a second threshold and the hidden features with the importance score above the second threshold;
   building a silent feature model using the silent features;
   building an important feature model using the important features;
   integrating the silent features and the important features into a single model by building an ensemble model with the silent feature model and the important feature model; and
   using the ensemble model to generate one or more predictions and one or more prescriptions comprising one or more recommendations.

2. The computer-implemented method of claim 1, wherein the input features include one or more stored features and one or more features identified by web scraping.

3. The computer-implemented method of claim 1, wherein the hidden features are identified using a conditional Generative Adversarial Network (cGAN) to generate the second number of the new features.

4. The computer-implemented method of claim 1, wherein operations within a Quantum Model Store build the silent feature model and the important feature model.

5. The computer-implemented method of claim 1, further comprising operations for:
   iteratively creating versions of the silent feature model until a version of the silent feature model is selected for storage based on statistics generated for the silent feature model.

6. The computer-implemented method of claim 1, further comprising operations for:

storing one or more versions of the silent feature model and one or more versions of the important feature model in a Quantum Model Store in a computer located in a cloud.

7. The computer-implemented method of claim 1, further comprising operations for:

normalizing the silent features; and scaling the silent features.

8. A computer program product, the computer program product comprising a computer readable storage medium having program code embodied therewith, the program code executable by at least one processor to perform operations for:

obtaining input features of a first number of features;

identifying hidden features of a second number of new features;

performing quantum feature importance scoring to assign an importance score to each of the input features and to each of the hidden features, wherein the quantum feature importance scoring uses a permutation importance technique;

identifying silent features as the hidden features with the importance score below a first threshold;

identifying important features as the input features with the importance score above a second threshold and the hidden features with the importance score above second threshold;

building a silent feature model using the silent features;

building an important feature model using the important features;

integrating the silent features and the important features into a single model by building an ensemble model with the silent feature model and the important feature model; and using the ensemble model to generate one or more predictions and one or more prescriptions comprising one or more recommendations.

9. The computer program product of claim 8, wherein the input features include one or more stored features and one or more features identified by web scraping.

10. The computer program product of claim 8, wherein the hidden features are identified using a conditional Generative Adversarial Network (cGAN) to generate the second number of the new features.

11. The computer program product of claim 8, wherein operations within a Quantum Model Store build the silent feature model and the important feature model.

12. The computer program product of claim 8, wherein the program code is executable by the at least one processor to perform operations for:

iteratively creating versions of the silent feature model until a version of the silent feature model is selected for storage based on statistics generated for the silent feature model.

13. The computer program product of claim 8, wherein the program code is executable by the at least one processor to perform operations for:

storing one or more versions of the silent feature model and one or more versions of the important feature model in a Quantum Model Store in a computer located in a cloud.

14. The computer program product of claim 8, wherein the program code is executable by the at least one processor to perform operations for:

normalizing the silent features; and scaling the silent features.

15. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-readable memories, to perform operations comprising:

obtaining input features of a first number of features;

identifying hidden features of a second number of new features;

performing quantum feature importance scoring to assign an importance score to each of the input features and to each of the hidden features, wherein the quantum feature importance scoring uses a permutation importance technique;

identifying silent features as the hidden features with the importance score below a first threshold;

identifying important features as the input features with the importance score above a second threshold and the hidden features with the importance score above the second threshold;

building a silent feature model using the silent features;

building an important feature model using the important features;

integrating the silent features and the important features into a single model by building an ensemble model with the silent feature model and the important feature model; and using the ensemble model to generate one or more predictions and one or more prescriptions comprising one or more recommendations.

16. The computer system of claim 15, wherein the input features include one or more stored features and one or more features identified by web scraping.

17. The computer system of claim 15, wherein the hidden features are identified using a conditional Generative Adversarial Network (cGAN) to generate the second number of the new features.

18. The computer system of claim 15, wherein operations within a Quantum Model Store build the silent feature model and the important feature model.

19. The computer system of claim 15, wherein the operations further comprise:

iteratively creating versions of the silent feature model until a version of the silent feature model is selected for storage based on statistics generated for the silent feature model.

20. The computer system of claim 15, wherein the operations further comprise:

storing one or more versions of the silent feature model and one or more versions of the important feature model in a Quantum Model Store in a computer located in a cloud.

* * * * *